(12) United States Patent
Sakayanagi et al.

(10) Patent No.: US 9,489,108 B2
(45) Date of Patent: Nov. 8, 2016

(54) TOUCH SWITCH MODULE

(71) Applicants: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

(72) Inventors: Noriyuki Sakayanagi, Kariya (JP); Koichi Masamura, Kariya (JP)

(73) Assignees: KABUSHIKI KAISHA TOYOTA JIDOSHOKKI, Kariya-shi, Aichi (JP); TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/488,594

(22) Filed: Sep. 17, 2014

(65) Prior Publication Data

US 2015/0084687 A1   Mar. 26, 2015

(30) Foreign Application Priority Data

Sep. 23, 2013 (JP) ................................ 2013-196298

(51) Int. Cl.
| | |
|---|---|
| *H03K 17/96* | (2006.01) |
| *G06F 3/0482* | (2013.01) |
| *G06F 3/0488* | (2013.01) |
| *G06F 3/044* | (2006.01) |

(52) U.S. Cl.
CPC ............. *G06F 3/0482* (2013.01); *G06F 3/044* (2013.01); *G06F 3/0488* (2013.01)

(58) Field of Classification Search
CPC ...... G06F 3/044; G06F 3/041; G06F 3/0488; G06F 3/0416
See application file for complete search history.

(56) References Cited

U.S. PATENT DOCUMENTS 8,816,986 B1* 8/2014 Park ........................ G06F 3/044
345/173

FOREIGN PATENT DOCUMENTS

| JP | 2006-18645 A | 1/2006 |
|---|---|---|
| JP | 2013-134546 A | 7/2013 |

* cited by examiner

*Primary Examiner* — Sibin Chen
(74) *Attorney, Agent, or Firm* — Sughrue Mion, PLLC

(57) ABSTRACT

A touch switch module according to one embodiment comprises a panel, a touch sensor and a control unit. The panel displays a slide bar including a step-up portion, a step-down portion, a non-responsive portion and a slide responsive portion. The control unit includes an up signal output unit which, when a short touch which is the touch for a short time is performed on the step-up portion, outputs an up signal for raising an operating condition of the electrical equipment by one level per short touch, a down signal output unit which, when the short touch is performed on the step-down portion, outputs a down signal for lowering the operating condition of the electrical equipment by one level per short touch, and an output forbidding unit which, when the touch is performed on the non-responsive portion, forbids the output of the operation signal.

5 Claims, 6 Drawing Sheets

TOUCH SWITCH MODULE

BACKGROUND OF THE INVENTION

1. Field of the Invention

One aspect of the present invention relates to a touch switch module.

2. Related Background Art

Patent Literature 1 discloses a conventional touch switch module. The touch switch module has a panel, a touch sensor and a control unit. The panel displays slide bars for instructing an operation of an electrical equipment. A touch sensor is an electrostatic capacitance sensor formed in the panel. The touch sensor detects a touch of a user's finger based on a voltage value generated upon the touch on the slide bar. The control unit is connected to the touch sensor. The control unit outputs an operation signal for operating the electrical equipment based on this touch.

The slide bar has a step-up portion positioned at an upper end, a step-down portion positioned at a lower end and a slide responsive portion. The slide responsive portion extends from the step-up portion to the step-down portion.

In this touch switch module, when a user moves a touch from the step-down portion to the step-up portion, i.e., slides the touch upward, the operating conditions of the electrical equipment are raised. When the user slides the touch downward from the step-up portion to the step-down portion, the operating conditions of the electrical equipment are lowered. Further, when the user performs a short touch which is a touch for a short time on the step-up portion, the operating conditions of the electrical equipment are raised by one level per short touch. On the other hand, when the user performs a short touch on the step-down portion, the operating conditions of the electrical equipment are lowered by one level per short touch.

Patent Literature 1: JP 2013-134546 A

SUMMARY OF THE INVENTION

However, in the conventional touch switch module, the slide responsive portion extends from the step-up portion to the step-down portion. Owing to this, when the user performs a short touch, the short touch is recognized as a touch on the slide responsive portion other than the step-up portion and the step-down portion in some cases. Since the step-up portion is positioned at the upper end of the slide bar, in particular, a short touch on the step-up portion is recognized as a downward slide in some cases. In this case, an operating condition which is not intended by the user is instructed to the electrical equipment.

One aspect of the present invention has been made in light of the situations of the conventional touch sensor, and an object of one aspect of the present invention is to provide a touch switch module which can more reliably operate an electrical equipment.

A touch switch module according to one aspect of the present invention comprises: a panel which displays a slide bar for instructing an operation of an electrical equipment; a touch sensor which is formed in the panel, and which detects a touch on the slide bar; and a control unit which is connected to the touch sensor, and which outputs an operation signal for operating the electrical equipment based on the touch, and the slide bar includes a step-up portion positioned at one end, a step-down portion positioned at an other end, a non-responsive portion which extends a predetermined length closer to the other end than the step-up portion and/or to the one end than the step-down portion, and a remaining slide responsive portion, and the control unit includes an up signal output unit which, when a short touch which is the touch for a short time is performed on the step-up portion, outputs an up signal for raising an operating condition of the electrical equipment by one level per short touch, a down signal output unit which, when the short touch is performed on the step-down portion, outputs a down signal for lowering the operating condition of the electrical equipment by one level per short touch, and an output forbidding unit which, when the touch is performed on the non-responsive portion, forbids the output of the operation signal (claim 1).

In the touch switch module according to one aspect of the present invention, the slide bar has a non-responsive portion which extends a predetermined length closer to the other end than the step-up portion and/or to the one end than the step-down portion, and the rest of the slide bars are the slide responsive portion. Further, the output forbidding unit of the control unit forbids an output of an operation signal when the non-responsive portion is touched. Consequently, when the user performs a short touch on the step-up portion and/or the step-down portion, even if the user touches the non-responsive portion at this time, an operation signal is not outputted to the electrical equipment by the touch on the non-responsive portion, so that an operation signal generated by a short touch on the step-up portion and/or the step-down portion is outputted to the electrical equipment. Further, when the user slides the touch on the slide responsive portion beyond the non-responsive portion, the operation signal generated by this slide is outputted to the electrical equipment.

Consequently, the touch switch module according to one aspect of the present invention can more reliably operate the electrical equipment.

According to another aspect of the present invention, the non-responsive portion may exist closer to only the other side than the step-up portion, exist closer to only the one end than the step-down portion or may exist at both of these positions. Further, the slide responsive portion is a rest of the slide bar except the step-up portion, the step-down portion and the non-responsive portion.

Further, according to another aspect of the present invention, the slide bar may extend from the upper end to the lower end, extend from the left end to the right end or may be inclined to extend. Furthermore, the slide bar may linearly extend or may be curved to extend.

With the touch switch module according to another aspect of the present invention, various devices such as an air-conditioning device, an audio device, a navigation system, illumination equipment, a mobile phone and the like may be adopted as the electrical equipments. For example, the electrical equipment may be an electrical equipment for a vehicle.

The touch sensor may be an electrostatic capacitance type sensor, and, in addition, may be a mechanical button, a surface acoustic wave sensor, an infrared sensor, a resistive sensor or the like. Further, according to another aspect of the present invention, the touch is not limited to a touch on the slide bar, and also includes nearly touch to the slide bar so that signals can be generated.

The one end may be an upper end. The other end may be a lower end. The non-responsive portion may extend downward of the step-up portion. The slide responsive portion may include the step-down portion (claim 2).

In this case, when the user performs a short touch on the step-up portion, even if the user touches the non-responsive portion at this time, an operation signal is not outputted to the electrical equipment by the touch on the non-responsive portion, so that an operation signal generated by a short touch on the step-up portion is outputted to the electrical equipment. Further, when the user slides the touch downward on the slide responsive portion beyond the non-responsive portion, the operation signal generated by this downward slide is outputted to the electrical equipment.

The one end may be a right end. The other end may be a left end. The non-responsive portion may include a first non-responsive portion which extends leftward of the step-up portion, and a second non-responsive portion which extends rightward of the step-down portion. The slide responsive portion may be between the first non-responsive portion and the second non-responsive portion (claim 3).

In this case, when the user performs a short touch on at least one of the step-up portion and the step-down portion, even if the user touches the non-responsive portion at this time, an operation signal is not outputted to the electrical equipment by the touch on the non-responsive portion, so that an operation signal generated by a short touch on at least one of the step-up portion and the step-down portion is outputted to the electrical equipment. Further, when the user slides the touch on the slide responsive portion beyond the non-responsive portion, the operation signal generated by this slide is outputted to the electrical equipment.

The touch switch module may further comprises a slide signal output unit which, when the touch moves and slides on the slide responsive portion, outputs a slide signal for changing the operating condition of the electrical equipment per slide (claim 4). In this case, it is possible to more reliably operate the electrical equipment.

The electrical equipment may be an air-conditioning device for a vehicle (claim 5). In this case, the user can suitably adjust a temperature in a vehicle interior during driving.

The touch switch module according to one aspect of the present invention can more reliably operate an electrical equipment.

DESCRIPTION OF THE PREFERRED EMBODIMENTS

Specific first and second embodiments of a touch switch module of the present invention will be described with reference to the drawings.

First Embodiment

Figure 1:
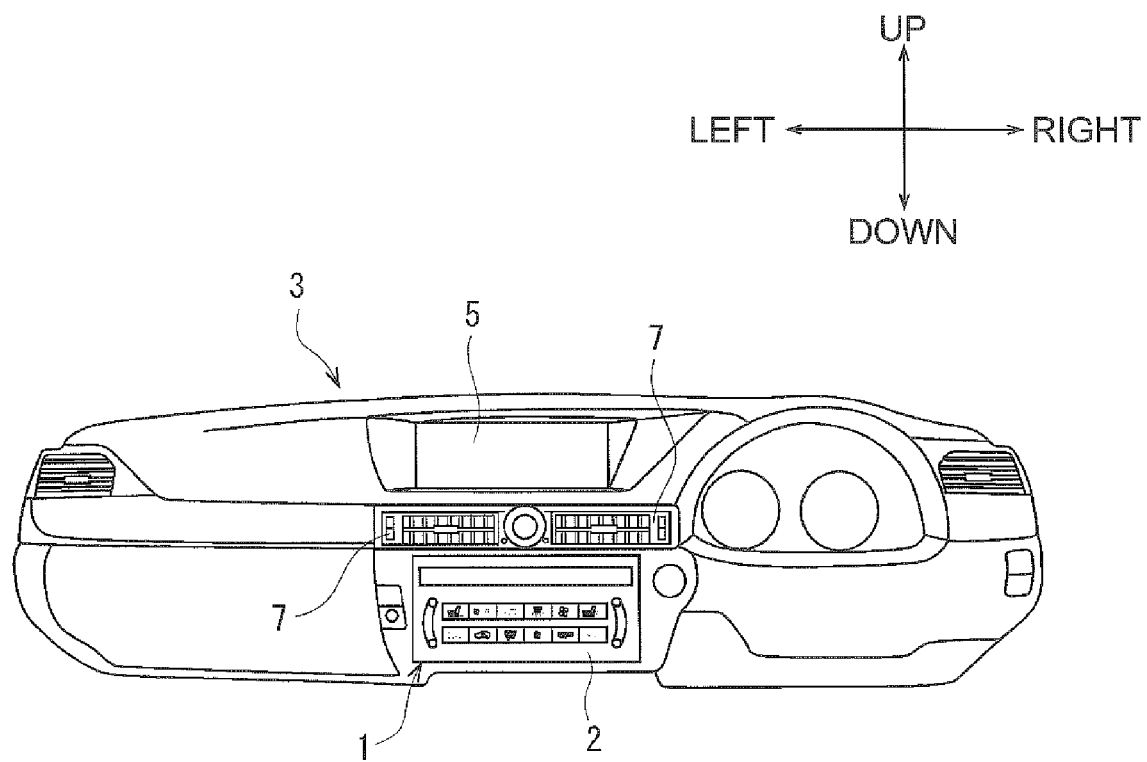
FIG. 1 is a front view of an instrument panel which uses a touch switch module according to a first embodiment.
Figure 3:
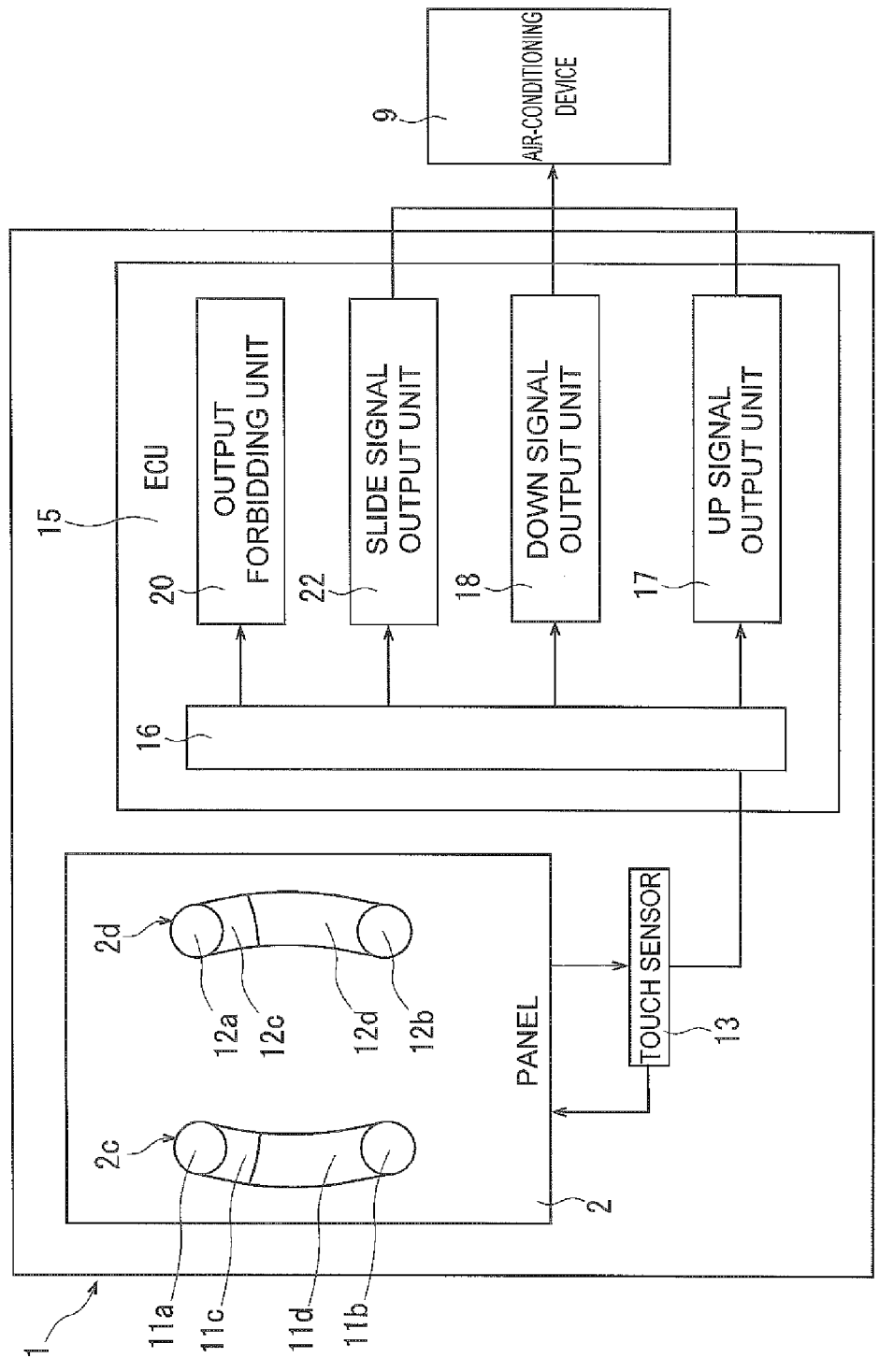
FIG. 3 is a block diagram illustrating the touch switch module according to the first embodiment.

As illustrated in FIGS. 1 and 3, an electrical equipment according to the first embodiment is an air-conditioning device 9 for a vehicle, and a touch switch module 1 controls this air-conditioning device 9. As illustrated in FIG. 1, the touch switch module 1 is mounted below a center portion of an instrument panel 3 which extends sideways in a vehicle interior. In addition, the instrument panel 3 has a car navigation system 5 and a center register 7 in addition to the touch switch module 1.

The touch switch module 1 has a panel 2 as illustrated in FIG. 3. On the panel 2, a display unit 2a is provided as illustrated in FIG. 2, and a plurality of touch pads 2b and left and right slide bars 2c and 2d are displayed.

The display unit 2a is positioned in an upper portion of the panel 2, and extends in a vehicle width direction. The display unit 2a displays various items representing a setting state and a current state of the air-conditioning device 9.

The touch pads 2b are provided in two rows in a lower portion of the panel 2. The touch pads 2b are provided with various items which a user pushes with a finger to operate the air-conditioning device 9. The items of the touch pads 2b correspond to various items displayed on the display unit 2a.

Figure 2:
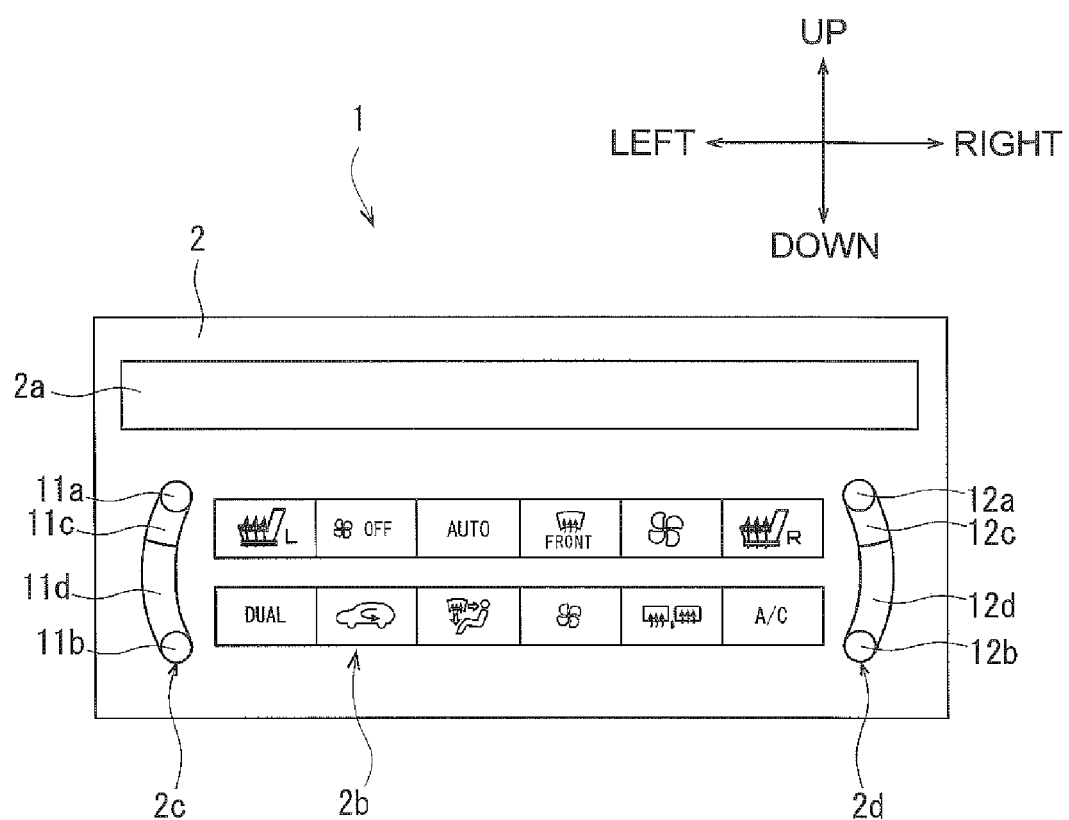
FIG. 2 is a front view of a panel of the touch switch module according to the first embodiment.

As illustrated in FIGS. 2 and 3, the slide bars 2c and 2d are positioned on the left and the right of the touch pads 2b to allow the driver of the vehicle and, in addition, a passenger sitting at the passenger's seat as users to perform an operation by the fingers. The slide bars 2c and 2d can be used to increase and decrease the temperature of air blown from the air-conditioning device 9 into the vehicle interior.

The slide bars 2c and 2d include step-up portions 11a and 12a positioned at upper ends, step-down portions 11b and 12b positioned at lower ends, non-responsive portions 11c and 12c and slide responsive portions 11d and 12d, respectively. The non-responsive portions 11c and 12c extend a predetermined length downward from the lower ends of the step-up portions 11a and 12a. The slide responsive portions 11d and 12d extend downward from the lower ends of the non-responsive portions 11c and 12c to the step-down portions 11b and 12b.

As illustrated in FIG. 3, the touch switch module 1 has the above-described panel 2 and, in addition, a touch sensor 13 and an ECU 15 as a control unit.

The touch sensor 13 is provided in a back surface of the touch pads 2b and the slide bars 2c and 2d of the panel 2. The touch sensor 13 detects a touch on the panel 2. The touch sensor 13 adopts an electrostatic capacitance type. In the present embodiment, the touch includes a slide and a tap and, in addition, a long tap and the like. In the present embodiment, the tap corresponds to a short touch. The long tap means that the finger or the like continues touching the touch pad 2b or the slide bars 2c or 2d for a time longer than a short time based on which the short touch is determined.

Figure 4:
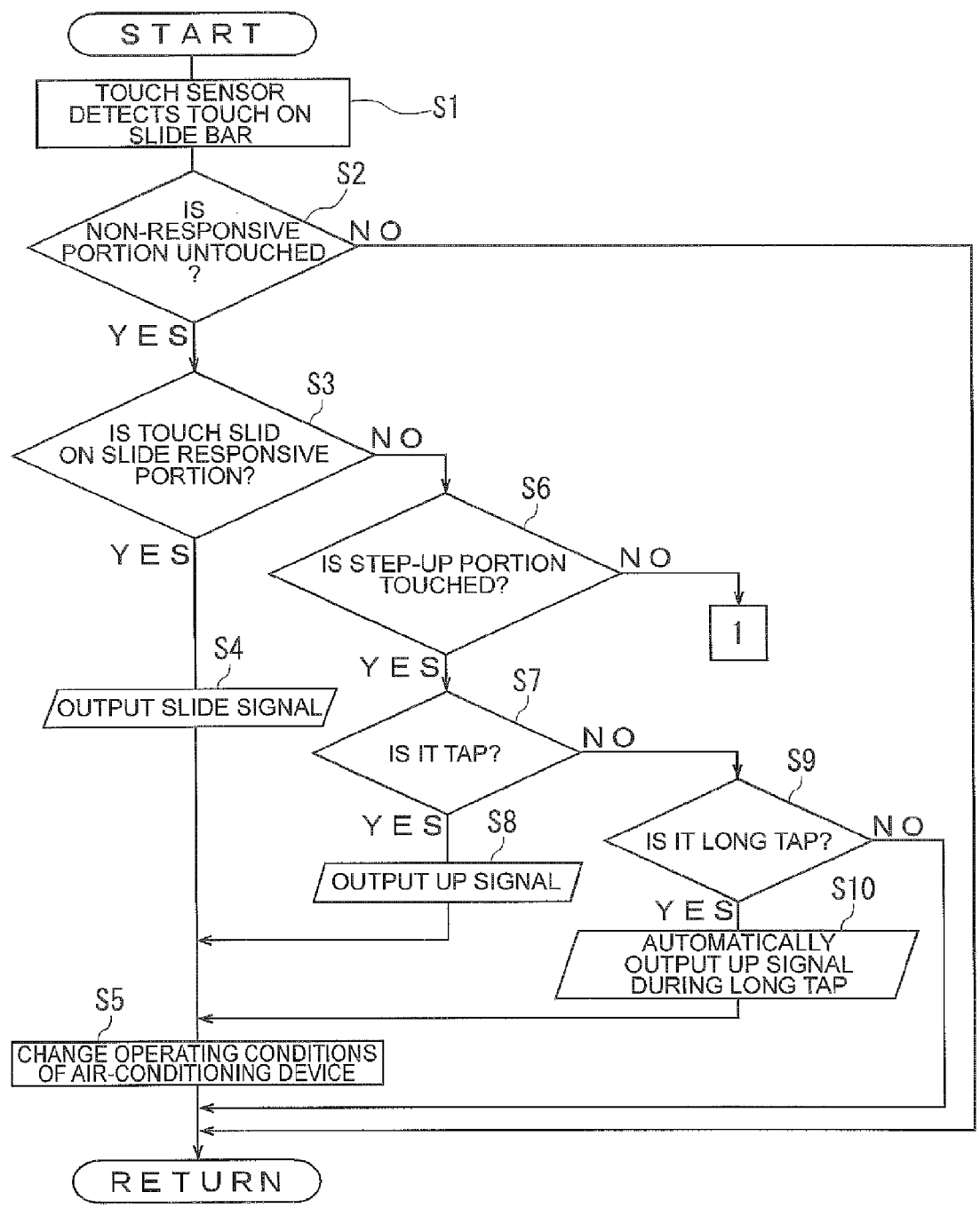
FIG. 4 is a flowchart illustrating that the panel of the touch switch module according the first embodiment is operated.

The ECU 15 is connected with the touch sensor 13. In the ECU 15, a program and the like for executing the flowchart illustrated in FIG. 4 are stored. As illustrated in FIG. 3, the ECU 15 has a signal processing unit 16, an up signal output unit 17, a down signal output unit 18, an output forbidding unit 20 and a slide signal output unit 22. The signal processing unit 16 is connected with the touch sensor 13, determines a touch performed on the touch sensor 13 and sorts each touch to the output unit. When the step-up portions 11a or 12a is tapped, the up signal output unit 17 outputs an up signal per tap. When the step-down portion 11b or 12b is tapped, the down signal output unit 18 outputs a down signal per tap. When the non-responsive portion 11c or 12c is touched, the output forbidding unit 20 forbids an output of an operation signal. When a touch is slid on the slide responsive portion 11d or 12d, the slide signal output unit 22 outputs a slide signal per slide.

The user in the vehicle interior operates the panel 2 while looking at various items displayed on the display unit 2a according to the temperature in the vehicle interior, and operates the air-conditioning device 9. When the user operates the panel 2, the ECU 15 starts the flowchart illustrated in FIG. 4.

When the user operates the slide bars 2e or 2d, the touch sensor 13 detects a touch on the slide bar 2c or 2d in step S1.

In subsequent step S2, whether or not the user touches the non-responsive portion 11c or 12c is determined. In this regard, when the user touches the non-responsive portion 11c or 12c, while the touch sensor 13 detects this touch, the output forbidding unit 20 forbids an output of an operation signal. When, for example, a touch is slid from the step-up portion 11a or 12a to the non-responsive portion 11c or 12c, i.e. from the above to the below, the output forbidding unit 20 forbids an output of an operation signal from the non-responsive portion 11c or 12c. Therefore, a determination result in step S2 is NO and the process returns to START.

When the user does not touch the non-responsive portion 11c or 12c, the determination result in step S2 is YES and the process moves to step S3.

When the touch is slid on the slide responsive portions 11d or 12d in step S3, the determination result is YES, the process moves to step S4. In step S4, the slide signal output unit 22 outputs a slide signal per slide. More specifically, when the user slides the touch on the slide responsive portion 11d or 12d from the below to the above, the slide signal output unit 22 outputs an up slide signal per slide. Further, when the user slides the touch on the slide responsive portion 11d or 12d from the above to the below, the slide signal output unit 22 outputs a down slide signal per slide. The up slide signal and the down slide signal correspond to slide signals.

In subsequent step S5, when the up slide signal is outputted, the temperature of the air blown from the air-conditioning device 9 rises by a first physical quantity. When a down slide signal is outputted per slide, the temperature of the air blown from the air-conditioning device 9 lowers by the first physical quantity. Further, when processing in step S5 is finished, the process returns to START. Conditions of the air-conditioning device 9 which realize a change in the temperature of the air blown from the air-conditioning device 9 correspond to operating conditions. The first physical quantity corresponds to one level for changing the operating conditions of the air-conditioning device 9 when the touch is slid on the slide responsive portions 11d or 12d.

When the touch is not slid on the slide responsive portions 11d or 12d, the determination result in step S3 is NO and the process moves to step S6. When the step-up portion 11a or 12a is touched in step S6, a determination result is YES and the process moves to step S7.

When a touch performed on the step-up portion 11a or 12a is a tap, a determination result in step S7 is YES and the process moves to step S8. In step S8, the up signal output unit 17 outputs an up signal per tap. Further, the process moves to step S5.

In step S5, when the up signal is outputted, the temperature of the air blown from the air-conditioning device 9 rises by a second physical quantity. Further, when processing in step S5 is finished, the process returns to START. The second physical quantity is smaller than the first physical quantity.

When the step-up portion 11a or 12 is not tapped, the determination result in step S7 is NO and the process moves to step S9. When the touch is a long tap, the determination result in step S9 is YES and the process moves to step S10.

During the long tap, in step S10, the up signal output unit 17 continues outputting up signals automatically and successively in a short time period. When the up signals are outputted automatically and successively in a short time period, in subsequent step S5, the temperature of the air blown from the air-conditioning device 9 automatically continues rising by the second physical quantity at a time. Further, when the processing in step S5 is finished, the process returns to START.

When the touch is not a long tap, the determination result in step S9 is NO, an operation error is recognized and the process returns to START.

Figure 5:
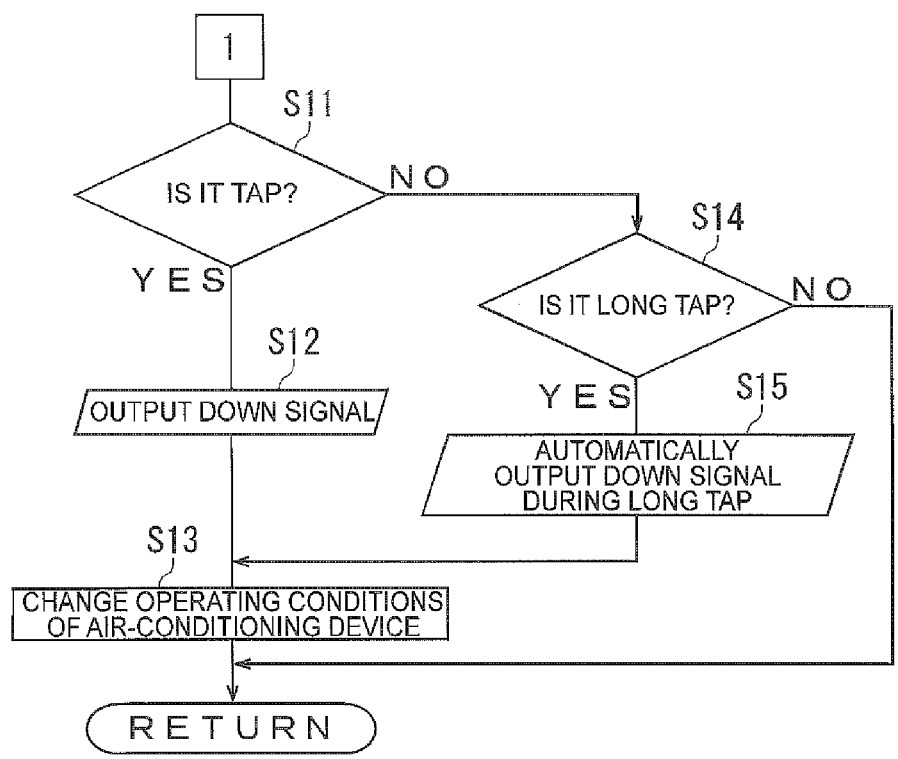
FIG. 5 is a flowchart illustrating that the panel of the touch switch module according the first embodiment is operated.

When the step-up portion 11a or 12a is not touched, the determination result in step S6 is NO and the process moves to step S11 illustrated in FIG. 5.

When the step-down portion 11b or 12b is tapped, a determination result in step S11 is YES and the process moves to step S12. In step S12, the down signal output unit 18 outputs a down signal per tap.

When the down signal is outputted, the temperature of the air blown from the air-conditioning device 9 lowers by the second physical quantity in subsequent step S13. Further, when processing in step S13 is finished, the process returns to START.

When the step-down portion 11b or 12b is not tapped, the determination result in step S11 is NO, and the process moves to step S14. When a long tap is performed on the step-down portion 11b or 12b, a determination result in step S14 is YES and the process moves to step S15.

While a long tap is performed on the step-down portion 11b or 12b, the down signal output unit 18 continues outputting down signals automatically and successively in a short time period in step S15.

When the down signals are outputted automatically and successively in a short time period, the temperature of the air blown from the air-conditioning device 9 is lowered automatically and continuously by the second physical quantity at a time in subsequent step S13. Further, when the processing in step S13 is finished, the process returns to START.

When a long tap is not performed on the step-down portion 11b or 12b, the determination result in step S15 is NO, an operation error is recognized and the process returns to START.

In this touch switch module 1, when the user taps the step-up portion 11a or 12a, even if the user touches the non-responsive portion 11c or 12c at this time, the output forbidding unit 20 forbids an output of an operation signal based on the flowchart, so that the operation signal is not outputted to the air-conditioning device 9. In this case, it is only determined that the step-up portion 11a or 12a is tapped, and the up signal output unit 17 outputs the up signal to the air-conditioning device 9. Consequently, it is possible to change the temperature of the air blown from the air-conditioning device 9 by the second physical quantity.

Further, when the user slides the touch on the slide responsive portion 11d or 12d from the above to the below, even if the user touches the non-responsive portion 11c or 12c at this time, the output forbidding unit 20 forbids an output of an operation signal based on the flowchart, so that the operation signal is not outputted to the air-conditioning device 9. In this case, it is only determined that the touch is slid on the slide responsive portion 11d or 12d from the above to the below, and the slide signal output unit 22 outputs a down slide signal to the air-conditioning device 9. Consequently, it is possible to lower the temperature of the air blown from the air-conditioning device 9 by the first physical quantity.

When the user slides the touch on the slide responsive portion 11d or 12d from the below to the above, in like manner, it is only determined that the touch is slid on the slide responsive portion 11d or 12d from the below to the above, and the slide signal output unit 22 outputs an up slide signal to the air-conditioning device 9. Consequently, it is possible to rise the temperature of the air blown from the air-conditioning device 9 by the first physical quantity.

Consequently, this touch switch module 1 can more reliably operate the air-conditioning device 9.

Second Embodiment

Figure 6:
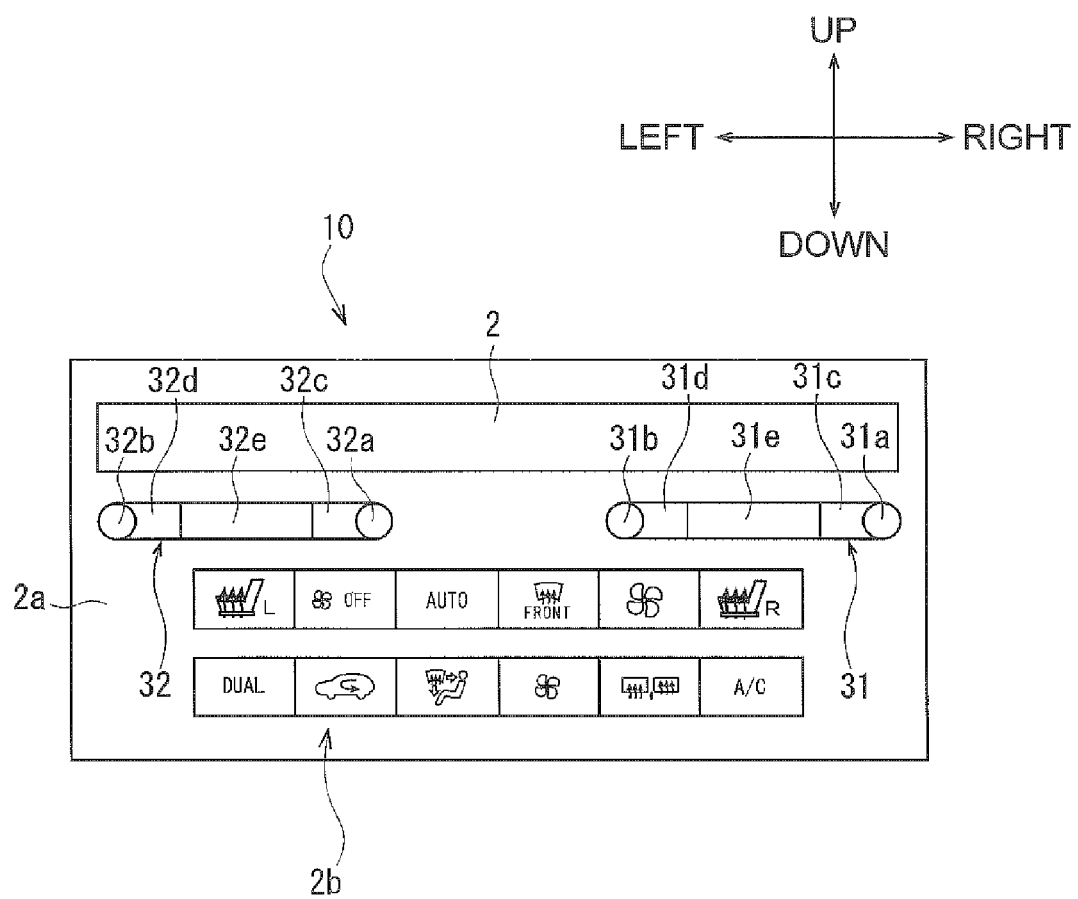
FIG. 6 is a front view of a panel of the touch switch module according to a second embodiment.

A touch switch module 10 according to the second embodiment displays on a panel 2 a pair of slide bars 31 and 32 which extend sideways as illustrated in FIG. 6. Both of the slide bars 31 and 32 are positioned between a display unit 2a and a plurality of touch pads 2b.

The slide bars 31 and 32 include step-up portions 31a and 32a positioned at right ends, step-down portions 31b and 32b positioned at left ends, first non-responsive portions 31c and 32c, second non-responsive portions 31d and 32d and slide responsive portions 31e and 32e, respectively.

The first non-responsive portions 31c and 32c extend a predetermined length in a direction more left than the step-up portions 31a and 32a. The second non-responsive portions 31d and 32d extend a predetermined length in a direction more right than the step-down portions 31b and 32b. The slide responsive portions 31e and 32e extend leftward and rightward between the first non-responsive portions 31c and 32c and the second non-responsive portions 31d and 32d. The other configurations are the same as those of the first embodiment.

In this touch switch module 10, when the user performs a short touch on the step-up portion 31a or 32a from the right side to the left side, even if the user touches the first non-responsive portion 31c or 32c at this time, an operation signal is not outputted to the air-conditioning device 9 by a touch on the first non-responsive portion 31c or 32c, so that an operation signal generated by the short touch on the step-up portion 31a or 32a is only outputted to the air-conditioning device 9.

Further, in this touch switch module 10, when the user performs a short touch on the step-down portion 31b or 32b from the left side to the right side, even if the user touches the second non-responsive portion 31d or 32d at this time, an operation signal is not outputted to the air-conditioning device 9 by a touch on the second non-responsive portion 31d or 32d, so that an operation signal generated by the short touch on the step-down portion 31b or 32b is only outputted to the air-conditioning device 9. The other functions and effects are the same as those of the first embodiment.

The present invention has been described above with the embodiments. The present invention is not limited to the above embodiments and can be adequately changed and applied in a range which does not deviate from the gist of the present invention.

Further, in a modified example of the touch switch module 1 according to the first embodiment, non-responsive portions which extend upward from the step-down portions 11b and 12b may be provided.

Furthermore, in a modified example of the touch switch module 10 according to the second embodiment, the step-up portions 31a and 32a may be positioned at the left ends, and the step-down portions 31b and 32b may be positioned at the right ends.

One aspect of the present invention can be used for an air-conditioning device for a vehicle, an audio device, a navigation system, illumination equipment, a mobile phone and the like.

What is claimed is:

1. A touch switch module comprising:
a panel which displays a slide bar for instructing an operation of an electrical equipment;
a touch sensor which is formed in the panel, and which detects a touch on the slide bar; and
a control unit which is connected to the touch sensor, and which outputs an operation signal for operating the electrical equipment based on the touch, wherein
the slide bar includes a step-up portion positioned at one end, a step-down portion positioned at an other end, a non-responsive portion which extends a predetermined length closer to the other end than the step-up portion and/or to the one end than the step-down portion, and a remaining slide responsive portion, and
the control unit includes an up signal output unit which, when a short touch which is the touch for a short time is performed on the step-up portion, outputs an up signal for raising an operating condition of the electrical equipment by one level per short touch, a down signal output unit which, when the short touch is performed on the step-down portion, outputs a down signal for lowering the operating condition of the electrical equipment by one level per short touch, and an output forbidding unit which, when the touch is performed on the non-responsive portion, forbids the output of the operation signal.

2. The touch switch module according to claim 1, wherein
the one end is an upper end,
the other end is a lower end,
the non-responsive portion extends downward of the step-up portion, and
the slide responsive portion includes the step-down portion.

3. The touch switch module according to claim 1, wherein
the one end is a right end,
the other end is a left end,
the non-responsive portion includes a first non-responsive portion which extends leftward of the step-up portion, and a second non-responsive portion which extends rightward of the step-down portion, and
the slide responsive portion is between the first non-responsive portion and the second non-responsive portion.

4. The touch switch module according to claim 1, further comprising a slide signal output unit which, when the touch moves and slides on the slide responsive portion, outputs a slide signal for changing the operating condition of the electrical equipment per slide.

5. The touch switch module according to claim 1, wherein the electrical equipment is an air-conditioning device for a vehicle.

* * * * *